United States Patent [19]

Tansel et al.

[11] Patent Number: 4,841,663
[45] Date of Patent: Jun. 27, 1989

[54] SNAGLESS FISHING LURE

[76] Inventors: David C. Tansel, 1200 Barton Hills Dr., #259, Austin, Tex. 78704; Kent Collins, 4889 Southeast Pineridge Way, Stuart, Fla. 33494

[21] Appl. No.: 135,644

[22] Filed: Dec. 21, 1987

[51] Int. Cl.⁴ ............................................. A01K 83/02
[52] U.S. Cl. ............................................. 43/34; 43/35
[58] Field of Search ............................. 43/34, 35, 36

[56] References Cited

U.S. PATENT DOCUMENTS 1,172,780  2/1916  Ferree ................................. 43/35
1,791,083  2/1931  Pike ................................... 43/34
2,729,013  1/1956  Chandler ............................. 43/35
3,574,265  4/1971  Gibbons .............................. 43/35

Primary Examiner—Kurt Rowan
Attorney, Agent, or Firm—Joseph F. Long

[57] ABSTRACT

A snagless fishing lure, wherein dual levers that engage a piston carrying a hook are pivotally connected on upper and lower sides of what may be a fish-shaped housing with the housing suitably constructed to conceal the hook when the piston is engaged with the forward end of the levers and the housing and piston are of suitable length and construction so that when both levers are depressed simultaneously a rubber band hooked between the piston and rear of the housing may propel the piston rearward to cause the hook to be ejected to catch the fish.

9 Claims, 1 Drawing Sheet

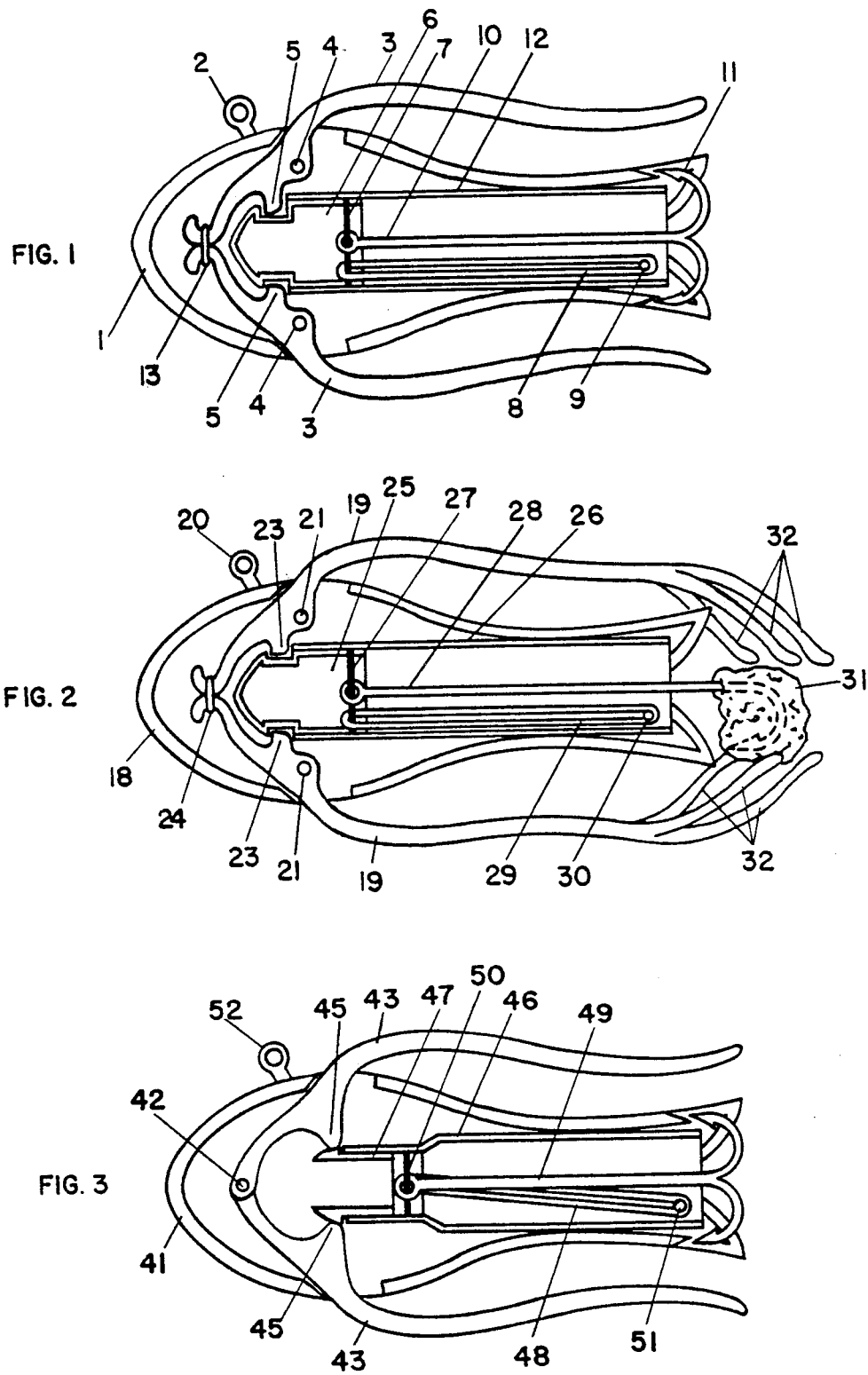

SNAGLESS FISHING LURE

BACKGROUND OF THE INVENTION

Although many various fishing lures are available, fishermen still lose many lures because of snagging on rocks, bottom vegetation or other subsurface obstacles. In most cases, this is because an exposed hook catches on these obstacles. There is, then, a need for a snagless lure.

Our invention fills this need by providing a lure that may be of various shapes but that completely conceals a hook which may have multiple points and is so designed that the hook partially ejects (usually to more than three-fourths its length) when dual levers are both depressed. Depressing one lever will not allow the hook to eject and the lever will reset when the obstacle causing depression is cleared. When a fish strikes, the dual levers are so positioned that both are depressed and the hook is rapidly partially ejected to catch the fish. In one embodiment, bait may be used on the hook and fingers on each lever then enclose the hook with the bait attached. This embodiment works in the same manner as described but has an advantage, in that, very small fish would not be able to pull off the bait. In this manner the lure also tends to selectively catch larger fish of the variety that are attracted more to bait.

Briefly, the working mechanism of one embodiment of the lure may be described as follows:

Dual levers inside the lure are pivotally positioned with the head end of the levers having projections that will hold a piston pushed between the levers, but will release the piston when both levers are simultaneously depressed at any spot on the levers external to the lure.

The hollow or open piston has a depression or multiple depression that engage the catches on the levers on the head end of the piston: the back part of the piston has a removable pin. The eye of the hook slides over this pin along with a rubber band. The lure and piston are so sized that when the rubber band is stretched from the piston pin to a pin in the back of the lure that the piston engages the dual lever catches and the hook barbed end is concealed in slots in the lure. When a fish strikes to depress both levers simultaneously the piston disengages from the levers and is propelled backward against the stop pin; thus partially ejecting the hook. It is desirable that the hook be ejected for a major part of its length to clear the end of the lure body. In a second embodiment, a single hook with small bait is normally used and the dual levers have cup-like fingers to enclose the hook and bait when the lure is "cocked" by depressing the piston to engage the dual lever arms.

In a third embodiment of the invention, the mechanism differs but the appearance and action are the same. In this case, a semi-flexible "U" shaped piston has a raised portion on the forward end that engages the piston guide wall when the mechanism is set or "cocked" by pushing the hook attached to the "U" shaped piston to position the piston at the forward end and stretch the spring or rubber band that attaches between the end of the lure and the piston. The dual levers are then pivoted at the very forward end and projections on the levers depress the ends of the semi-rigid "U" shaped piston when the levers are depressed; this releases the piston, which then is projected backward by the rubber band or spring.

A device where both levers must be depressed simultaneously and wherein when only one lever is depressed the lever resets itself is unique. A further unique feature in one embodiment is a finger type bait enclosure that opens to eject the baited hook when a fish strikes.

The lure must be properly balanced with proper interrelationship of weight and point of attachment to the fishing line to give a normal swimming motion to the lure as it is pulled through the water. Various shapes, sizes, and colors may be used with the mechanism as described protecting the hook until a fish strikes and then rapidly partially ejecting the hook to catch the fish.

BRIEF DESCRIPTION OF THE INVENTION

The invention comprises a mechanism contained in a fishing lure to cause a hook to be partially ejected when a fish strikes and depresses dual levers external to the lure. The dual levers are so designed as to add to the natural appearance of the lure.

In a first embodiment, the mechanism comprises:
(a) dual levers pivotally attached on top and bottom of a lure;
(b) means such as a small rubber band, preferably of neoprene, to provide a small force pulling the front ends of the levers towards each other;
(c) projections on the levers between the front end and the pivot point that will engage a depression in the piston when the piston is pushed between the levers;
(d) a piston guide for the piston that extends nearly full length of the lure and contains a removable pin in the back part of the guide;
(e) a hollow or open piston with a conical front end, a depression behind this conical front end and a removable pin of a smaller diameter than the eye of a fish hook in the back portion of the piston;
(f) a fish hook loosely mounted within the piston by slipping the eye of the hook over the removable pin in the piston;
(g) a rubber band or extensible spring that connects the removable pin in the piston and the stop pin in the rear of the piston guide in such a manner that the spring or rubber band is stretched when the piston is in the forward position and engaged with the dual levers. When a fish strikes and depresses the dual levers the piston disengages and is propelled backward to the stop pin and almost totally ejects the hook;
(h) the lure body, piston length and length of the fish hook are so related in this embodiment that this barbed portion of the fish hook is concealed within the lure when the hook is pushed into the lure causing the piston to engage the dual lever projections and stretching the spring or rubber band that propels the piston backward when the piston is disengaged by a fish striking.

In a second embodiment, sizes of the various parts are changed so that bait may be put on a hook and the bait and hook pushed close to the back of the lure in order to cause the piston to engage the dual levers or "cock" the mechanism. In this embodiment, the dual levers may be fitted with fingers to partially enclose the bait and thereby prevent small fish from taking the bait.

In a third embodiment, a semi-flexible "U" shaped piston with small projections to catch on the piston guide wall when the piston is pushed completely forward is used. The dual levers are then pivotally attached to each other at the very forward end. Each lever then has projections, such that when both levers are simultaneously depressed, the projections depress the walls of the semi-flexible "U" shaped piston so that projections on the piston are disengaged from the side wall and the piston, which is spring or rubber band loaded as in the first embodiment, then is propelled backward to partially eject the hook. Thus, although the mechanism differs somewhat, this embodiment functions the same as the first embodiment.

BRIEF DESCRIPTION OF THE DRAWINGS

FIG. 1 shows a first embodiment of the invention wherein a rigid round or square hollow piston is held in a position to stretch a spring or rubber band with projections of dual levers holding in a depression on the forward end of the piston. When both levers are simultaneously depressed the piston is released and the hook attached to the piston is ejected until the back of the piston hits the stop pin in the rear portion of the lure. The stop pin also may serve to fasten lure halves together and to anchor one end of the spring or rubber band that is held by a pin that also holds the hook eye in the rear of the piston.

FIG. 2 is almost exactly similar to FIG. 1, except that fingers on the dual levers may partially enclose bait placed on the end of the hook. Again this mechanism causes the hook (and bait) to partially eject when both levers are simultaneously depressed.

FIG. 3 is a third embodiment that operates to eject a hook but uses a semi-flexible "U" shaped piston that "cocks" by depressible projections on the piston engaging the piston guide. This piston guide may be molded in the two halves of the lure. These halves may be held together by a dual function bolt that pivotally engages the beginning end of each of two levers and by a second bolt that anchors one end of the loading spring or rubber band and also serves as a stop to limit ejection of the piston. The piston is released when a fish strikes to simultaneously depress both levers. Projections on the levers depress both sides of the front portion of the piston causing it to disengage from the piston guide only when both levers are simultaneously depressed.

DETAILED DESCRIPTION OF THE DRAWINGS

FIG. 1 shows a cut-away view of one-half of the lure body with an eye 2 to attach the lure to the fishing line. This eye 2 being so located as to cause lure 1 to ride horizontally through the water. Levers 3 with projection 5 are pivotally attached by pins 4. Pin 4 may also serve to fasten the two halves of the lure 1 together. The forward ends of the levers 3 are biased towards each other by a stretchable band 13. The piston 6 in piston guide 12 has a depression to engage projections 5 on the levers 3 and has a shape to facilitate pushing it into the projections 5. A pin 7 located in the back part of the open piston 6 is sized so that an eye of the hook 10 fits over the pin 7. This pin 7 also serves to anchor one end of a rubber band 8. The other end of the rubber band 8 is anchored over pin 9 and the drawing shows the mechanism in the "cocked" position wherein the rubber band is stretched (note a spring could also be used here). The pin 9 also may serve to fasten the halves of the lure together. The hook barbs 11 are hidden and protected in slots in the lure body 1.

In FIG. 2 we show a different embodiment that operates much the same as the embodiment shown in FIG. 1. In FIG. 2, we show a lure body 18, levers 19, an eye 20 to fasten the lure to the fishing line; pins 21 that act as a pivot point for the levers 19 and also may be used to fasten two halves of the lure 18 to each other; projections 23 on the levers 19 are shown in the "cocked" position engaging a depression in the open piston 25. The levers 19 are biased together at the forward end by a spring or flexible band 24. The open piston 25 in piston guide 26 contains a pin 27 that is sized to slip through the eye of the hook 28. this pin 27 also serves to connect with one end of the stretchable band 29. The other end of the band 29 may loop around pin 30 which also serves as a piston stop and may further be used to fasten two halves of lure 18 together. Sizes of the parts in this embodiment are such as to allow putting bait 31 on the hook 28 before the mechanism is in the "cocked" position. Levers 19 are equipped with "fingers" 32 that serve to protect the bait 31 from very small fish, but are so shaped as to allow the bait 32 to be ejected until piston 25 hits stop pin 30 when both levers 19 are simultaneously depressed.

In FIG. 3, we have shown a third embodiment wherein the mechanism is somewhat simplified but operates essentially the same as the previous two. In FIG. 3 in this embodiment we show lure body 41, a pivotal connection pin 42 connecting the beginning end of levers 43; this pin 42 may also serve to hold two halves of the lure body 41 together; projections 45 on levers 43 act to depress the forward projections on a semi-flexible "U" shaped piston 47 and disengage piston 47 when both levers 43 are simultaneously depressed. The piston 47 and piston guide 46 are so designed that depressing one lever 43 does not disengage the piston 47 and when one lever 43 is no longer depressed, the depressed side of piston 47 returns to the "cocked" position as shown in FIG. 3. A pin 50 in the bottom rigid box-like portion of piston 47 is sized and removably held so that the eye of hook 49 may be slipped over pin 50. This pin 50 also engages one end of stretchable rubber band 48. The other end of this stretchable rubber band 48 engages pin 51 which also acts as a stop to limit the backward ejection of piston 47 and thereby hook 49. The lure is further equipped with an eye 52 to hook to the fishing line. Location of this eye 52 and weighting of lure 41 are such as to cause lure 41 to move horizontally with a natural swimming motion as the fisherman reels in the line.

What is claimed is:

1. A snagless fishing lure comprising:
   (a) a housing,
   (b) a piston guide within said housing,
   (c) a piston with a depression around a forward end and a first pin across a rearward end, of said piston in said piston guide,
   (d) a hook with an eye of said hook around said first pin in said piston,
   (e) dual levers with one lever pivotally connected on either side of said housing and with each of said levers having projections that engage said depression in said piston when said piston is pushed to a forward end of said piston guide,
   (f) a first rubber bond means to bias said forward ends of said dual levers toward each other,
   (g) a second pin in said housing to limit rearward travel of said piston,
   (h) a second rubber band means stretched between said first pin and said second pin to bias said piston carrying said hook rearward when both of said dual levers are simultaneously depressed to cause said projections on said dual levers to disengage said piston, (i) means whereby a force on one of said levers will disengage said projection on said one of said lever from said depression in said piston and will allow said one of said projections to re-engage said depression in said piston when said force is removed, said means comprising proper fit of said piston in said piston guide and said first rubber band means biasing together said forward ends of said dual levers.

2. A snagless fishing lure as in claim 1, wherein said housing may be shaped like a fish and may have rearward slots to contain the barbed portions of said hook, and have one of said dual levers on an upper side and one of said dual levers on a lower side of said housing, with an eye on said housing and with said eye so located and said housing so weighted as to cause said lure to have a natural swimming motion when pulled through the water.

3. A snagless fishing lure as in claim 1, where said housing is slotted and of proper length to conceal said barbs on said hook when said piston is pushed to a forward position so that said depression of said piston engages said projections on said dual levers.

4. A snagless fishing lure as in claim 1, where said housing is a suitable length and each of said dual levers has a multiplicity of fingers facing each other and suitably spaced to have a piece of bait attached to said hook and contained in said fingers.

5. A snagless fishing lure comprising:
(a) a housing,
(b) a piston guide,
(c) a semi-flexible "U" shaped piston with depressable means to engage said piston guide when said piston is in a forward end of said piston guide,
(d) dual levers pivotally connected at a forward end, and so shaped as to disengage said piston from said piston guide when said dual levers are depressed,
(e) elastic means between a first pin in a rear portion of said semi-flexible "U" shaped piston and a second pin at a rearward portion of said piston guide to propel said semi-flexible "U" shaped piston rearward when said piston is disengaged from a frontward portion of said piston guide.

6. A snagless fishing lure as in claim 5, where said semi-flexible "U" shaped piston comprises a rectangular box-like bottom portion with two semi-flexible sides attached to said bottom portion; said two semi-flexible sides being of sufficient length and having protrusions at a top end that will engage said piston guide when said semi-flexible "U" shaped piston is in a foremost position 7. A snagless fishing lure as in claim 6, wherein a foremost end of said piston guide fits said semi-flexible "U" shaped piston closely and a rearward portion is larger than said semi-flexible "U" shaped piston including said protrusions on said two semi-flexible sides.

8. A snagless fishing lure as in claim 5 wherein portions of said levers external to the housing may be so shaped as to enclose a rearward end of said housing.

9. A snagless fishing lure comprising
(a) a lure body,
(b) a piston guide within said lure body,
(c) a piston with a depression around a forward end of said piston and a first pin across a rearward end of said piston,
(d) a hook with an eye of said hook around said first pin in said piston,
(e) a first rubber band means around said first pin and around a second pin in the rear of said piston guide with said rubber band means being stretched between said first pin and said second pin when said piston is held in a foremost position in said piston guide when projections on each of dual levers pivotally mounted in said lure body are engaged in said depression on said piston; said rubber band means propelling said piston and said hook rearward when a force on both of said dual levers causes both of said projections to disengage from said depression around said forward end of said piston,
(f) a second rubber bank means to bias together forward ends of said dual levers.

* * * * *